United States Patent Office
3,255,154
Patented June 7, 1966

3,255,154
VULCANIZATION OF HALOGENATED BUTYL
RUBBER POLYMERS
Richard H. Dudley, Cranford, N.J., assignor to Esso Research and Engineering Company, a corporation of Delaware
No Drawing. Original application Aug. 26, 1960, Ser. No. 52,021. Divided and this application Mar. 4, 1963, Ser. No. 262,381
1 Claim. (Cl. 260—78.4)

The present invention relates to improved vulcanizable compositions of halogenated copolymers of isoolefins and multiolefins. More particularly, it deals with curing halogenated butyl rubber at an accelerated rate to give a vulcanizate of improved physical and dynamic properties.

This is a divisional application of Serial No. 52,021, filed August 26, 1960.

Copolymers of the above general class, particularly where the copolymers contain about 85 to 99.5 wt. percent of a $C_4$ to $C_8$ isoolefin, e.g., isobutylene, with about 1.5 to 0.5 wt. percent of a multiolefin of about 4 to 14 carbon atoms, e.g., myrcene, isoprene, butadiene, 3-methyl-butene-1, etc. are well known in the literature as "butyl rubber." For example, see "Synthetic Rubber" by G. S. Whitby, and U.S. Patent 2,356,128 among many others. Polymerization is generally carried out at low temperatures, i.e. —50 to —165° C. in the presence of Friedel-Crafts catalyst such as aluminum chloride dissolved in a lower alkyl halide. Butyl has viscosity average molecular weight of 200,000 to 1,500,000 and mole percent unsaturation of about 0.1 to 30. Halogenated butyl rubber-type copolymers are produced by halogenating butyl rubber in a manner which does not substantially degrade its molecular weight but, however, gives a rubbery product of substantially different properties than the un-halogenated material. Butyl rubber may be halogenated at temperatures of —50° 200° C., preferably 0° to 100° C., and at pressures of 0.5 to 900 p.s.i.a with suitable halogenating agents such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a non-solvent at about 0 to 180° C., spray drying, or by flashing off the hydrocarbon solvent by injection into a hot water bath.

Preferably, the degree of halogenation, is carefully regulated so that the halogenated copolymer contains at least 0.5 wt. percent of combined halogen but not more than about one atom of combined fluorine or chlorine per double bond in the polymer, nor more than three atoms of combined bromine or iodine per double bond. The brominated and chlorinated copolymers are preferred. A more detailed description of the formation of chlorinated butyl rubber may be had by referring to coassigned Serial No. 512,182, filed May 31, 1955, now U.S. No. 2,944,578, patented July 12, 1960.

The halogenated copolymer has a viscosity average molecular weight of about 100,000 to 2,000,000 and a mole percent unsaturation of between 0.1 to 20, preferably less than 10. As hereinafter employed in the specification, the term "halogenated butyl rubber" denotes the above-described halogenated copolymers of a major portion of a $C_4$ to $C_8$ isoolefin and a minor portion of a $C_4$ to $C_{14}$ multiolefin.

Although halogenated butyl rubber can be used in the manufacture of numerous articles, because of its relatively low degree of unsaturation and small percentage of halogen, e.g., 0.5 to 3%, it does not cure as quickly as other more highly unsaturated rubbery polymers. Materials which will accelerate the cure of natural rubber or butadiene-styrene rubber, such as guanidines, may not increase the cure rate of halogenated butyl rubber. Thus, there exists a need for a system whereby halogenated butyl rubber may be more rapidly cured to give a vulcanizate of good physical properties. Such a cure system is particularly desired in applications of halogenated butyl rubber such as tubeless tires, shoe soles, wire coatings, conveyor belting and extrusion and molding of items such as automobile motor mounts.

In accordance with the present invention, halogenated butyl rubber may be rapidly cured to give a vulcanizate having good physical properties. More particularly, it has now been discovered that excellent cures are obtained within a short period of time by curing halogenated butyl rubber in the presence of certain compounds which are known in the art as retarders for high unsaturation rubbers, e.g. natural rubber, butadiene-styrene, etc. More particularly, halogenated butyl rubber is cured in the presence of an accelerating quantity, e.g., 0.1 to 15, preferably 0.5 to 10, parts by weight per hundred of rubber of a member of the group consisting of wood rosins (unhydrogenated, hydrogenated, and esterified), benzoic acid, salicylic acid and maleic anhydride.

This is indeed a surprising result. It would be expected that these known high unsaturation rubber retarders, such as wood rosin, benzoic acid, salicylic acid, maleic anhydride, etc. (see India Rubber World Handbook of Compounding Ingredients, Edition II, Conway Printing Co., New York, 1947), would retard, to even a greater degree, the cure rate of a less unsaturated rubber such as halogenated butyl rubber. However, exactly the converse has been discovered.

The unexpected nature of the action of the above specific materials is emphasized by the fact that very closely related compounds such as succinic acid, fumaric acid (known retarders) and phthalic anhydride will not accelerate the cure of halogenated butyl rubber. The inability of phthalic anhydride to accelerate the cure of halogenated butyl rubber is particularly noteworthy. Phthalic anhydride is a known accelerator for chloroprene rubber (neoprene). Thus its inability to enhance the cure rate of low unsaturation, low halogen content, halogenated butyl rubber clearly indicates the latter's basic dissimilarity to high unsaturation, high chlorine content neoprene rubbers. This is further demonstrated by the fact that curing agents for neoprene rubbers, such as magnesium dioxide, will not cure halogenated butyl copolymers.

The compositions of the present invention may be cured under a broad range of temperatures, e.g. 200 to 400° F., preferably 250–350° F., as well as under various conditions, e.g. oven curing, open steam heating during extrusion or molding, etc.

The accelerating compounds employed in the present compositions are utilized in conjunction with conventional curing agents. Thus, the present compositions may contain 1 to 20% of a metal oxide, such as zinc oxide, and/or minor proportions, e.g. 0.1 to 15 wt. percent of sulfur, tetramethyl thiuram disulfide, benzothiazyl disulfide or mercaptobenzothiazole.

Vulcanization recipes prepared in accordance with the present invention may contain the various additional materials such as carbon black, mineral fillers, pigments, anti-oxidants, extender oils, etc. If desired, blends of halogenated butyl rubber and other rubbery polymers, e.g. natural rubber, butadiene-styrene rubber, etc. may be covulcanized.

base recipe shown was compounded with the various materials indicated in Table I. The resulting samples were then cured at 287° F. for the periods of time indicated and the physical properties of the vulcanizates obtained were tested to determine the rapidity of the vulcanization step.

Staybelite resin is a trade name for hydrogenated wood rosin. Staybelite ester #10 is a trade designation for the glycerol ester of hydrogenated wood rosin (physical properties: odorless, hard, brittle, amber-colored resin, Sp. Gr. 1.08, M.P. 74–78° C., Acid No. 10 max.).

TABLE I

Base Recipe, Parts by Weight:
    Halogenated Butyl Rubber A __ 100
    MT Black _____ 60
    EPC Black _____ 20
    Process Oil _____ 15
    Zinc Oxide _____ 5

| Sample | Control | (a) | (b) | (c) | (d) | (e) | (f) |
|---|---|---|---|---|---|---|---|
| Activator Type | | Sulfur | Staybelite Resin | Staybelite Ester #10 | Wood Rosin | Benzoic Acid | Succinic Acid |
| Activator Conc., phr | 0 | 1 | 5 | 5 | 5 | 1 | 1 |
| Tensile Strength, p.s.i.—Cure at 287° F.: | | | | | | | |
| 15 mins | (¹) | (¹) | 1,060 | 520 | 1,080 | 450 | (¹) |
| 20 mins | (¹) | (¹) | 1,150 | 820 | 1,260 | 900 | 160 |
| 25 mins | 160 | 170 | 1,180 | 1,100 | 1,220 | 1,020 | 290 |
| 30 mins | 270 | 380 | 1,070 | 1,050 | 1,200 | 1,050 | 540 |
| 45 mins | 1,090 | 1,060 | 1,100 | 1,070 | 1,200 | 980 | 880 |
| 60 mins | 1,100 | 1,050 | 1,060 | 1,050 | 1,180 | 1,190 | 1,050 |
| 90 mins | 1,040 | 1,120 | 1,040 | 1,080 | 1,120 | 1,150 | 1,050 |
| Modulus at 300%, p.s.i.—Cure at 287° F.: | | | | | | | |
| 15 mins | (¹) | (¹) | 500 | 220 | 650 | 200 | (¹) |
| 20 mins | (¹) | (¹) | 570 | 370 | 700 | 430 | 100 |
| 25 mins | 110 | 100 | 500 | 500 | 700 | 500 | 160 |
| 30 mins | 150 | 120 | 470 | 500 | 670 | 570 | 200 |
| 45 mins | 550 | 500 | 500 | 550 | 700 | 600 | 540 |
| 60 mins | 620 | 620 | 510 | 550 | 670 | 640 | 590 |
| 90 mins | 670 | 750 | 580 | 580 | 750 | 680 | 700 |
| Elongation at Break, percent—Cure at 287° F.: | | | | | | | |
| 15 mins | (¹) | (¹) | 650 | 550 | 590 | 600 | (¹) |
| 20 mins | (¹) | (¹) | 610 | 540 | 620 | 550 | 880 |
| 25 mins | 960 | 940 | 640 | 540 | 590 | 530 | 780 |
| 30 mins | 740 | 770 | 620 | 540 | 630 | 510 | 680 |
| 45 mins | 470 | 500 | 610 | 520 | 610 | 470 | 460 |
| 60 mins | 460 | 470 | 570 | 490 | 620 | 470 | 450 |
| 90 mins | 450 | 440 | 570 | 500 | 580 | 480 | 420 |
| Time to Reach Optimum Tensile, Mins | 45 | 45 | 20 | 25 | 20 | 25 | 90 |

¹ No Cure.

The term "wood rosins," as employed in the present specification, denotes wood rosin and its various derivatives such as hydrogenated wood rosin and esterified wood rosin, examples of the latter being the polyhydric alcohol esters, e.g., ethylene glycol or glycerol esters.

The various aspects and modifications of the present invention will be made more clearly apparent by reference to the following description and accompanying examples.

*Examples 1 through 5*

A typical halogenated butyl rubber copolymer, hereinafter denoted as "halogenated butyl rubber A," was compounded in the manner indicated below. Halogenated butyl rubber A was a copolymer of about 97 wt. percent isobutylene and 3 wt. percent isoprene having a viscosity average molecular weight of about 450,000 and containing 0.8 to 1.2 wt. percent chlorine.

A masterbatch of halogenated butyl rubber A and conventional compounding ingredients, as shown in Table I, was prepared. Several runs were made in which the As shown by the above data, the use of wood rosin, hydrogenated wood rosin, esterified wood rosin or benzoic acid accelerates the cure rate of halogenated butyl rubber. Whereas neither the conventional zinc oxide nor sulfur cure gave a vulcanizate when cured for 20 minutes at 287° F., the compositions of the present invention give vulcanizates of good physical properties when cured under these conditions.

The inability of succinic acid to accelerate the cure of halogenated butyl rubber is demonstrated in sample (f).

*Examples 6 and 7*

Halogenated butyl rubber A was compounded into the base recipe shown below, the type of acid or anhydride incorporated in the recipe being as indicated in the samples. The resulting compositions were then cured for varying periods of time at 287° F. and their 300% modulus to measure the extent of the tightness of the cure.

TABLE II

Base Recipe, Parts by Wt.:
- Halogenated Butyl Rubber A __ 100
- MT Black __ 60
- EPC Black __ 20
- Process Oil __ 15
- Zinc Oxide __ 5
- Acid or Anhydride (as shown) __ 1

| Sample | (a) | (b) | (c) | (d) | (e) |
|---|---|---|---|---|---|
| Acid or Anhydride | None | Maleic Anhydride | Salicylic Acid (Retarder W) | Fumaric Acid | Phthalic Anhydride (Esen) |
| Cure at 287° F.—300% Modulus p.s.i.: | | | | | |
| 15 mins | 470 | 720 | 780 | 470 | 480 |
| 30 mins | 720 | 950 | 870 | 700 | 730 |
| 45 mins | 670 | 870 | 850 | 720 | 670 |
| 60 mins | 775 | 975 | 920 | 770 | 675 |

As illustrated in Table II, the incorporation of either maleic or salicyclic acid (both known retarders) accelerates the cure rate of halogenated butyl rubber and gives a much more firmly cured recipe for short cure periods. The inability of either fumaric acid or phthalic anhydride to accelerate the cure rate of halogenated butyl rubber is illustrated by samples (d) and (e).

Various modifications may be made to the present invention. The compositions of the present invention may be utilized for wire coatings, extruded or molded items such as conveyor belting, tubes and particularly tires and tire liners, chafers, sidewalls or tiegums between butyl rubbers and more highly unsaturated rubbers.

Having described the present invention, that which is sought to be protected is set forth in the following claim.

What is claimed is:

A process which consists essentially of the steps of (a) admixing, per 100 parts of a rubbery halogenated copolymer of between about 85 and about 99.5 wt. percent of a $C_4$ to $C_8$ isoolefin and between about 15 and about 0.5 wt. percent of a $C_4$ to $C_{14}$ multiolefin, said halogenated copolymer containing 0.5–3 wt. percent combined halogen, (1) between about 1 and about 20 wt. percent of zinc oxide and (2) between about 0.1 and about 15 wt. percent of maleic anhydride, and (b) curing said composition at a temperature of between about 200° F. and about 400° F. to provide a vulcanizate therefrom.

References Cited by the Examiner

UNITED STATES PATENTS

| | | | |
|---|---|---|---|
| 2,395,778 | 2/1946 | Breck | 260—85.3 |
| 2,548,505 | 4/1951 | Turner et al. | 260—85.3 |
| 2,845,403 | 7/1958 | Gunberg | 260—78.4 |
| 3,018,275 | 1/1962 | Cottle | 260—85.3 |
| 3,033,832 | 5/1962 | Sernink et al. | 260—78.4 |
| 3,104,235 | 9/1963 | Kuntz et al. | 260—85.3 |

OTHER REFERENCES

India Rubber World Handbook of Compounding Ingredients, ed. II, Conway Printing Co., N.Y., 1947, pages 135–136, 246 TS 1890I53.

JOSEPH L. SCHOFER, *Primary Examiner.*

E. J. SMITH, *Assistant Examiner.*